2,757,213

PROCESS FOR PREPARING CHLORO-FLUORO METHANE FROM PHOSGENE AND HYDROGEN FLUORIDE

Donald D. Coffman, West Chester, Pa., and Charles W. Tullock, Wilmington, Del., assignors to E. I. du Pont de Nemours & Company, Wilmington, Del., a corporation of Delaware No Drawing. Application February 18, 1955, Serial No. 489,296

5 Claims. (Cl. 260—653)

This invention relates to a new process of preparing fluorine-containing organic compounds. More particularly, it relates to a process of preparing completely halogenated methanes in which at least one of the halogen atoms is fluorine, any other halogen being chlorine. These compounds, which include carbon tetrafluoride and the chlorofluoromethanes, will be referred to hereinafter as fluorine-containing perhalomethanes.

The fluorine-containing perhalomethanes are extremely valuable compounds, finding extensive use as refrigerant liquids, as dielectric fluids and as ingredients of insecticidal compositions, e. g., as propellants in aerosols. Carbon tetrafluoride is the starting material in a new process (disclosed in Serial No. 390,441, now abandoned, filed by M. W. Farlow on November 6, 1953, a continuation-in-part of which has been issued as U. S. Patent 2,709,192) of synthesizing the industrially important tetrafluoroethylene, wherein carbon tetrafluoride is reacted with carbon at very high temperatures, e. g., in a carbon arc.

This invention has as an object the provision of a process for the preparation of perhalomethanes containing fluorine. A further object is the provision of a process for preparing compounds of the formula $CF_xCl_{4-x}$ wherein F is an integer from 1 to 4. Other objects will appear hereinafter.

These objects are accomplished by the present invention of a process for preparing the fluorine-containing perhalomethanes, i. e., carbon tetrafluoride and the chlorofluoromethanes, which comprises reacting hydrogen fluoride with carbon and phosgene, the latter being used as the preformed phosgene or made in situ from its components, carbon monoxide and chlorine, at a temperature within the range of about 600° C. to about 1500° C., and isolating the fluorine-containing perhalomethanes formed.

The phosgene employed in the reaction can be preformed or it can be formed in situ from carbon monoxide and chlorine which are known to combine readily at elevated temperature to give phosgene. When this is done, the carbon monoxide is preferably, though not necessarily, used in excess over the amount calculated to react with the chlorine. The hydrogen fluoride is used in substantially anhydrous form. Commercial hydrogen fluoride is satisfactory for this purpose. The carbon can be used in any form, including coal, graphite, charcoal, the various forms of carbon black such as lamp black, acetylene black, bone black, etc. In general, higher conversions are obtained with active carbon, and preferably active charcoal, of which many varieties are obtainable commercially. Active carbon is very finely divided, porous carbon having a total surface area of at least 20 square meters per gram (Hassler, "Active Carbon," Chemical Publishing Co., 1951, p. 127). The carbon need not be rigorously pure and it may, for example, contain the normal amount of ash, e. g., from 0.5 to 4% by weight in the case of most active carbons. However, it should be substantially anhydrous. It is desirable to dehydrate the carbon prior to reaction since carbon, especially of the active or absorbent variety, can retain significant amounts of water even at high temperatures.

As promoter for the reaction there can be employed a catalytic amount, e. g., from 0.5 to 5 moles, per 100 moles of hydrogen fluoride, of a halide of a metal in which halide the metal is in a valance stage of 3 to 5 and the halogen is a normally gaseous halogen, i. e., fluorine or chlorine, including antimony pentachloride, aluminum trifluoride, tin tetrachloride, ferric fluoride, ferric chloride, etc. Where the metal halide is volatile it can be introduced with the gaseous reactants. Where it is substantially non-volatile at the reaction temperature it can be admixed with the carbon.

While the relative ratios of the reactants are not critical, it is desirable, in order to direct the reaction toward the formation of the more desirable carbon tetrafluoride, that the reaction mixture contain at least one mole of hydrogen fluoride per mole of phosgene. The best results are obtained when the molar ratio of hydrogen fluoride to phosgene is between about 1:1 and 3:1. The carbon is normally used in excess of the other reactants.

At temperatures below about 600° C. there is obtained only a very small amount of the perhalomethanes, the main reaction product being carbonyl fluoride, as disclosed in application Serial No. 489,294, filed by C. W. Tullock of even date herewith. It is therefore not practical to operate below about 600° C. At temperatures of about 1500° C. and above other products, including tetrafluoroethylene, begin to be formed in significant amounts. Thus, to obtain practical yields of carbon tetrafluoride and the chlorofluoromethanes, it is desirable to work within the range of about 600° C. to about 1500° C. The preferred temperature range is that between 700° C. and 1200° C.

The reaction can be carried out in sealed pressure vessels at the autogeneous pressure developed by the reactants and reaction products at the operating temperature. However, it is much more conveniently carried out at or near atmospheric pressure, e. g., at pressures between about 50 mm. of mercury and 2 or 3 atmospheres, in a tubular reactor packed with carbon. In this type of operation, a gaseous mixture in the proper proportions of hydrogen fluoride and phosgene, or of hydrogen fluoride, carbon monoxide and chlorine is passed through the reactor heated to the desired temperature. It is sometimes desirable to operate at pressures slightly less than atmospheric so as to obviate any leak from the apparatus. The contact time is not very critical since appreciable conversions are observed even at short contact times, e. g., two seconds. Good results are obtained at contact times in the range of 5–80 seconds, although much longer contact times can be used, e. g., 10 minutes or more.

Because of the presence in the reaction mixture of hydrogen fluoride and chlorine, there are only few suitable materials of construction for the reactor, since almost all materials are rapidly attacked by one or the other of these corrosive gases at the high temperatures required. At or near the lower end of the temperature range, nickel tubes or platinum-lined tubes can be used, but they fail at higher temperatures. The most suitable reactors are graphite tubes. Alumina tubes made of high purity alumina are also satisfactory if the temperature does not exceed about 1000° C.

The reaction product contains, besides carbon tetrafluoride and the chlorofluoromethanes, substantial amounts of carbonyl fluoride and carbonyl chlorofluoride. In addition, it contains the hydrogen chloride formed in the reaction, unreacted phosgene and generally chlorine, the latter being either introduced as a reactant or formed from the phosgene used. Carbon dioxide and carbon monoxide are also present. If it is desired to isolate only the fluorine-containing perhalomethanes, the most convenient procedure consists in treating the effluent gas with water or an alkaline solution, e. g., aqueous sodium hydroxide, to remove all acidic or hydrolyzable products (hydrogen chloride, hydrogen fluoride, chlorine, carbonyl fluoride, carbonyl chlorofluoride, carbon dioxide and phosgene), after which the alkali-insoluble product is fractionally distilled to separate the components. If it is desired to recover also the carbonyl fluoride and carbonyl chlorofluoride present, the reaction mixture should be treated to remove the hydrogen chloride, since the latter has the same boiling point as carbonyl fluoride and is not separable therefrom by fractionation. This is done according to the process described and claimed in the concurrently filed Tullock application Serial No. 489,294. Briefly stated, this process consists in treating the reaction mixture with an agent (alkali metal fluoride, sulfur trioxide or phosphorus pentoxide) which absorbs the hydrogen chloride without affecting the carbonyl fluoride. The reaction mixture, with or without a preliminary separation therefrom, by cooling to an appropriate temperature, of unreacted phosgene and/or hydrogen fluoride, is brought into contact with at least a stoichiometric amount, based on the hydrogen chloride in the reaction product and on any hydrogen fluoride there present, of the absorbing material, and contact is maintained at a temperature at least as high as 0° C. until substantially all of the hydrogen chloride is removed. The remaining product is then fractionally distilled to separate the various constituents.

The invention is illustrated in greater detail in the following examples.

*Example I*

The reactor was a graphite tube 28.5" long, 1" outside diameter and 0.75" inside diameter, placed inside a nickel tube. The center portion of the graphite tube was packed with 65 ml. of activated charcoal, which filled 9 inches of the tube. The heated portion of the tube (13 inches) comprised this center portion. Prior to reaction, the activated charcoal was dehydrated by heating it at 800° C. for 14–16 hours in a slow stream of helium.

The reactants (phosgene and hydrogen fluoride in this example) were weighed separately, then combined in a stainless steel cylinder, which was then warmed to 42–47° C. and from which the reactant mixture was bled at a predetermined rate. A slow stream of helium was used as the carrier gas.

At the exit end of the reactor tube was a train of receivers consisting of two copper traps cooled in a carbon dioxide/acetone mixture, followed by two glass traps cooled in liquid nitrogen. The system was protected from atmospheric moisture.

A mixture of 46.5 g. (0.47 mole) of phosgene and 20.6 g. (1.03 moles) of commercial anhydrous hydrogen fluoride was placed in the feed cylinder. Of this mixture, a total of 56.5 g. was passed through the reactor tube heated at 775–850° C. over a period of 3.8 hours. The product collected in the carbon dioxide/acetone traps during the entire run amounted to 5.5 g. This material was bled into a stainless steel cylinder containing 80 g. of anhydrous sodium fluoride. After remaining in contact with this absorbent for 24 hours at room temperature, all the hydrogen fluoride and hydrogen chloride present had been removed. The residual product, which amounted only to 1.5 g., was not analyzed.

A first portion (38%) of the reactant mixture was passed through the tube at the rate of 0.72 g. per minute. From this first portion there was received in the liquid nitrogen traps 11 g. of condensate. This material was bled into a cylinder containing 80 g. of sodium fluoride and cooled in liquid nitrogen. Any carbon monoxide present was removed by pumping off the cylinder down to a pressure of 0.2 mm. of mercury, after which the cylinder was sealed and allowed to stand at room temperature for 24 hours. The residual product, which was thus freed of carbon monoxide, hydrogen fluoride and hydrogen chloride, weighed 4.0 g. Infrared analysis showed that it contained, on a molar basis, 10% $CF_4$, 25% $CF_3Cl$, 25% $COF_2$, 2% $COFCl$, 15% $CO_2$ and 1% or less each of $CF_2Cl_2$, $COCl_2$, and $SiF_4$ (the latter through hydrolysis by adventitious water and reaction of the hydrogen fluoride formed with the glass of the analytical cell). Chlorine was also present.

The remainder of the reactant mixture was passed through the tube at the following rates: 30% at 0.20 g./min,. 20% at 0.26 g./min., and 12% at 0.10 g./min. The total condensate in the liquid nitrogen traps from this second portion amounted to 27.5 g. It was treated for removal of CO, HF and HCl as described above, after which treatment it weighed 13.0 g. This material was found by infrared analysis to contain, in moles per cent, 25% $CF_4$, 15% $CF_3Cl$, 35% $COF_2$, 5% $CO_2$, 1% each of $CF_2Cl_2$, $COCl_2$, and $SiF_4$. Chlorine was also present.

From these data it can be calculated that the conversion of hydrogen fluoride to carbon tetrafluoride in this entire run was about 20%.

*Example II*

In a run similar to that described in Example I, 35.5 g. of a reactant mixture made up of 0.77 mole of hydrogen fluoride and 0.34 mole of phosgene was passed, at the rate of 0.455 g. per minute, through a graphite-lined reactor tube partly packed with active charcoal and heated at 800° C. In this case, a serious leak developed in the apparatus because the reactor tube was provided with a nickel thermocouple well which was deeply corroded by the chlorine formed at the reaction temperature. This was shown by the fact that only 15 g. of the 35.5 g. input was recovered, and that 8.5 g. of yellow nickel chloride was removed from the tube at the end of the reaction. The product collected in the carbon dioxide/acetone traps (4.5 g.) was all unchanged hydrogen fluoride. The product collected in the liquid nitrogen traps (10.5 g.) was freed from carbon monoxide and hydrogen chloride as described in Example I. There was left 2.0 g. of a material which infrared analysis showed to contain, on a molar basis, 45% carbon tetrafluoride, 25% chlorotrifluoromethane, 20% carbon dioxide and 0.5% dichlorodifluoromethane.

*Example III*

Using the apparatus and procedure described in Example I, except that the active charcoal was replaced by a commercial acetylene black (Shawinigan black), a mixture of 44.6 g. (0.45 mole) of phosgene and 20 g. (1.0 mole) of hydrogen fluoride was passed through the reactor at 775–850° C. during a period of 2.8 hours. A portion (49%) of the reactant mixture was put through at the rate of 0.51 g./minute, another portion (31%) at the rate of 0.33 g./minute and the remainder at the rate of 0.23 g./minute. The total product condensed in the liquid nitrogen traps amounted to 24.0 g. After treatment to remove CO, HF and HCl as described in Example I, there was left 12.5 g. of product which infrared analysis showed to contain, in moles per cent, 5% $CF_4$, 20% $CF_3Cl$, 15% $COF_2$, 3% $COFCl$, 7% $CO_2$, 1% each $COCl_2$ and $SiF_4$, and a small amount of $CF_2Cl_2$. Chlorine was also present. The material condensed in the carbon dioxide/acetone traps contained small amounts of $CF_4$ and $CF_3Cl$.

*Example IV*

In this experiment the reactants were hydrogen fluoride, carbon monoxide and chlorine. The chlorine and the hydrogen fluoride were weighed separately, then combined in a stainless steel cylinder. The cylinder was warmed to 57–67° C. and the reactants bled out at a predetermined rate. Before entering the graphite tube they were mixed with carbon monoxide which was used in excess. No carrier gas was used. Except for these modifications, the apparatus and procedure were those of Example I. The graphite reactor tube was packed with 65 ml. of active charcoal and heated to 775–850° C. There was passed through the tube during a period of 4.5 hours a reactant mixture of 39 g. (0.55 mole) of chlorine and 19.5 g. (0.98 mole) of hydrogen fluoride, together with excess carbon monoxide. Twenty-nine per cent of the reacant mixture was passed through at the rate of 0.28 g./minute and the rest at the rate of 0.14 g./minute. The total condensate collected in the liquid nitrogen traps amounted to 45.0 g. It was treated as described above to remove CO, HF, and HCl, after which there was left 17.0 g. of product, which infrared analysis showed to contain, on a molar basis, 25% $CF_4$, 25% $CF_3Cl$, 35% $COF_2$, 10% $CO_2$, 5% $COFCl$, 1% $CF_2Cl_2$ and traces of $COCl_2$ and $SiF_4$. The material condensed in the carbon dioxide/acetone traps was mostly hydrogen fluoride and phosgene, with a small amount of dichlorofluoromethane. The conversion of hydrogen fluoride to carbon tetrafluoride was about 21%.

The fluorine-containing perhalomethanes produced according to the process of this invention can be separated from the other components by fractionation at low temperature and elevated pressure. For example, a suitable fractionating sill comprises a monel metal column 45" high and 1.75" internal diameter packed with small stainless steel rings. The still is designed, like all low temperature/elevated pressure stills, to distill at substantially constant temperature. Cuts are made as the pressure changes. The still head is surrounded by coils through which acetone cooled in a carbon dioxide/acetone bath is circulated. As already noted, fractionation will not separate hydrogen chloride from carbonyl fluoride. If it is desired to recover the latter in a substantially pure state, the hydrogen chloride should first be removed from the reaction product as described above. However, carbon tetrafluoride can readily be separated by fractionation with or without prior removal of the hydrogen chloride. If only carbon tetrafluoride and the chlorofluoromethanes are desired, it is convenient to remove first all the acidic and hydrolyzable components from the reaction product, then fractionate the remainder at low temperature and elevated pressure.

The foregoing detailed description has been given for clearness of understanding only and no unnecessary limitations are to be understood therefrom. The invention is not limited to the exact details shown and described for obvious modifications will occur to those skilled in the art.

The embodiments of the invention in which an exclusive property or privilege is claimed are defined as follows:

1. Process for the preparation of perhalomethanes of the formula $CF_xCl_{4-x}$ wherein $x$ is an integer from 1 to 4 which comprises bringing hydrogen fluoride and phosgene in contact with carbon under essentially anhydrous conditions at a emperature within the range from about 600° C. to about 1500° C.

2. Process according to claim 1 wherein the reaction is conducted in a continuous flow system at about atmospheric pressure.

3. Process for the preparation of perhalomethanes of the formula $CF_xCl_{4-x}$ wherein $x$ is an integer from 1 to 4 which comprises bringing hydrogen fluoride and phosgene in contact with carbon under essentially anhydrous conditions at a temperature within the range from about 700° C. to about 1200° C.

4. Process for the preparation of carbon tetrafluoride which comprises bringing hydrogen fluoride and phosgene in contact with carbon under essentially anhydrous conditions at a temperature within the range from about 600° C. to about 1500° C. and isolating the carbon tetrafluoride.

5. Process for the preparation of carbon tetrafluoride which comprises bringing hydrogen fluoride and phosgene in contact with carbon in a continuous flow system, at about atmospheric pressure, under essentially anhydrous conditions, and at a temperature within the range from about 700° C. to about 1200° C. and isolating the carbon tetrafluoride.

No references cited.